United States Patent [19]
Vinsonhaler

[11] Patent Number: 5,407,575
[45] Date of Patent: Apr. 18, 1995

[54] OIL SPILL CLEANUP AND RECOVERY SYSTEM

[76] Inventor: Charles W. Vinsonhaler, Rte. 10, Box 24LD, New Braunfels, Tex. 78132

[21] Appl. No.: 91,534

[22] Filed: Jul. 14, 1993

Related U.S. Application Data

[63] Continuation of Ser. No. 825,022, Jan. 24, 1992, abandoned.

[51] Int. Cl.⁶ ............................................... C02F 1/40
[52] U.S. Cl. .................................. 210/484; 210/502.1; 210/508; 210/680; 210/924; 428/71; 428/308.4
[58] Field of Search ............ 210/680, 242.4, 282, 210/484, 502.1, 506–508, 924, 693; 428/71, 291, 308.4, 484

[56] References Cited

U.S. PATENT DOCUMENTS

| | | | |
|---|---|---|---|
| 3,607,741 | 9/1971 | Sohnius | 210/680 |
| 3,667,608 | 6/1972 | Burroughs et al. | 210/242.4 |
| 3,739,913 | 6/1973 | Bogosian | 210/924 |

*Primary Examiner*—Ivars Cintins
*Attorney, Agent, or Firm*—Lalos & Keegan

[57] ABSTRACT

The present invention comprises a two-part sorbent pad having a flat, chemically treated polyethylene foam inner core completely surrounded by a flexible, durable, chemically treated polypropylene fabric cover. In use, the sorbent pad of the present invention floats on top of petroleum covered water to rapidly soak up the petroleum or oil and hold it within the inner core until it can be removed by squeezing the sorbent pad between rollers, thereby depositing the oil into a container for storage. The non-petroleum laden sorbent pad is then returned to the surface of the petroleum covered water to pick-up more petroleum. The sorbent pad is chemically treated to increase the pads ability to attract and hold oil by both adsorption and absorption and to further increase its ability to repel water.

12 Claims, 1 Drawing Sheet

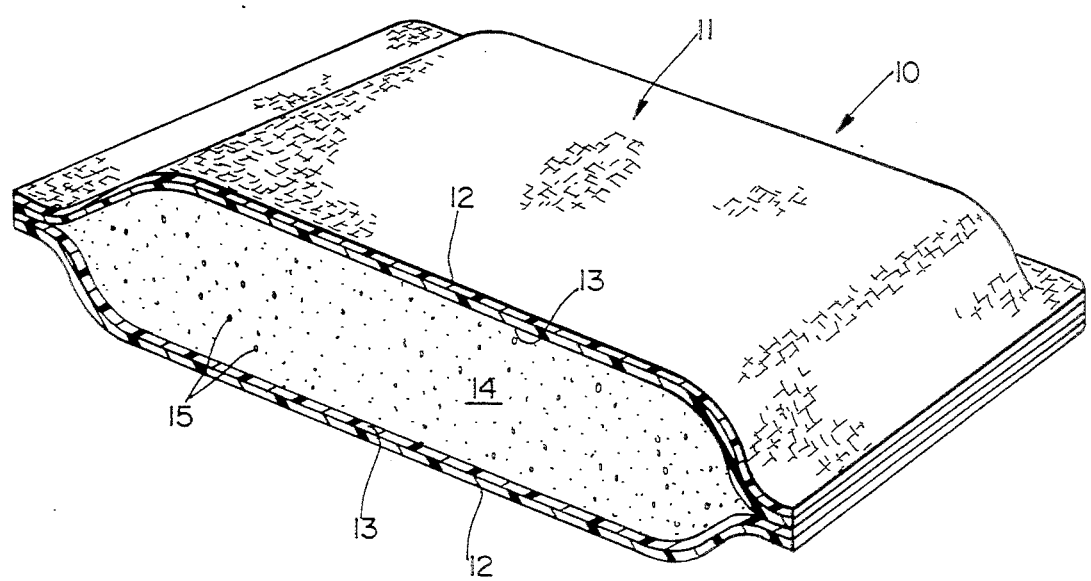

OIL SPILL CLEANUP AND RECOVERY SYSTEM

This is a continuation of application Ser. No. 07/825,022 filed on Jan. 24, 1992, now abandoned.

BACKGROUND OF THE INVENTION

The present invention relates to liquid hydrocarbon cleanup and recovery system using sorbents, and more specifically, but not by way of limitation, to a reusable two-part sorbent pad chemically treated to enhance its ability to rapidly soak up and hold liquid hydrocarbons and repel water. The term liquid hydrocarbons refers to oil and other petroleum products and will be referred to throughout as oil.

The ecological disasters resulting from oil spills have created a great need for effective cleanup systems. Present cleanup systems include booms, dispersants, thickeners, skimmers, and sorbents.

Booms are mechanical barriers which contain and concentrate spilled oil. They are available in various sizes and shapes used to encircle a spill, floating with a portion above and below the water surface to keep oil from splashing over or escaping beneath. Booms are used mainly for containment, and do not sufficiently contribute to the recovery and cleanup of the spilled oil. Additionally, because booms serve as containment systems, much of the spilled oil sinks to the bottom, precluding recovery, damaging undersea life, and forming tar balls which wash up on shore.

Dispersants are generally liquid chemicals which when applied to the surface of the spill accelerate the dispersal of the oil by reducing the surface tension between the oil and the water. However, some of these chemicals are toxic, and therefore, must be used judiciously. Dispersants are costly and do little to help the environment since the volatiles are released to the atmosphere. Although the concentrated spill has been dispersed, the oil itself remains in the water.

Thickeners or herding agents thicken the oil by increasing the surface tension between the oil and the water, which reduces the spreading of the spill and permits easier cleanup, however, thickeners are expensive, and some thickeners are toxic. In addition, the thickened oil will sink sooner than oil that has not been treated. Once the oil sinks, any cleanup at the surface is precluded.

Skimmers mechanically remove the spilled oil from the surface of the water. The basic types include: vacuum, gravity, oleophilic, and centrifugal skimmers. Skimmers operate to separate the oil from the water, however, most skimmers are inefficient and leave much of the recovered oil mixed with water, thereby making oil recycling expensive and economically impractical.

Although the above systems do operate to reduce the ecological damage created by oil spills, they provide only a partial solution. Dispersants provide little solution because they merely disperse the oil without removing it from the environment. Containment systems and thickeners also do not remove the oil, but instead must be used with a removal system such as a skimmer. All four systems are expensive which makes them economically impractical. Most importantly, however, all four systems are ineffective for large oil spills and will not function properly in bad weather, accompanied by very rough seas.

Another type of oil cleanup system is sorbents. Sorbents function to soak up surface oil when placed on an oil spill. The sorbents recover the spilled petroleum by either adsorption, in which the petroleum is attracted to the sorbent surface and then adhered to it, or absorption, in which the petroleum penetrates the pores of the sorbent material. Sorbents are generally marketed in particulate form for spreading over a slick or as sheets, rolls, pillows, or booms. Sorbent material may consist of natural products, such as feathers, peat or straw; mineral compounds, such as ash, vermiculite, or perlite; and most commonly synthetic products, such as polyethylene or polypropylene. Although more effective than the above systems, typical sorbents are frequently not reusable, and are ineffective when it is desired to recycle the oil. Once sorbents are used to soak up the oil spill, they present a disposal problem. Most sorbents when saturated are presently disposed of by burying them in approved landfills or by burning them in accordance with local regulations. Both methods are ecologically injurious and statutes, both state and federal are being enacted to limit such activity.

Accordingly, the sorbent pad of the present invention has been constructed to be highly reusable, to be effective even in the roughest water, to recover the greatest amount of oil and permit the recycling of recovered oil. The sorbent pad of the present invention provides both an ecological and economic advantage over conventional oil spill cleanup systems.

SUMMARY OF THE INVENTION

The present invention comprises a two-part sorbent pad system having a flat, chemically treated polyethylene foam inner core completely surrounded by a flexible, durable, chemically treated polypropylene fabric cover. The chemical treatment enhances the sorbent pad's affinity for hydrocarbon products and causes them to repel water. The inner core is the storage chamber and the fabric cover is the protective housing.

In use, the sorbent pads are floated on top of the petroleum covered water, rapidly soaking up the oil and holding it within the inner core. The inner core holds the oil until it can be removed by squeezing the sorbent pads, thereby depositing the oil into a container. The non-oil ladened sorbent pad is then returned to the surface of the oil covered water to pick up more oil.

The sorbent pads of the present invention may be used in combination with a retrieval system that comprises a roller or wringer arrangement designed to accommodate the different sizes and types of sorbent pads being used. The rollers or wringers squeeze the petroleum out of the pad as they pass through. The petroleum squeezed out then flows into a holding tank below the roller system for storage. The pad is then ready for reuse.

Even when fully saturated with oil, the sorbent pads of the present invention continue to float above the surface of the water making them highly visible, which aids in their retrieval. Additionally, because the petroleum is contained within the inner core and not allowed to return to the water, it is protected from evaporation, emulsification, and contamination for long periods. The oil will remain unemulsified and uncontaminated for many months after absorption by the sorbent pads. The present invention is an improvement over prior sorbent pads because the oil contained in the pads may be recycled rather than simply being disposed of along with the conventional sorbent pad.

The sorbent pads of the present invention are designed to allow them to function as adsorbents as well as absorbents. That is, the outer surface attracts and the inner core adsorbs as well as absorbs the oil while repelling water. Most conventional sorbent pads soak up a large amount of water with the oil, thereby making the reclamation of the oil extremely difficult and for the most part economically unfeasible. In contrast, the sorbent pads of the present invention not only repel most of the water, but also hold an increased volume of oil in comparison to other sorbents. Because that large volume of oil can be completely reclaimed, the sorbent pads of the present invention provide not only ecological but also economical benefits.

Another advantage of the present invention is that few personnel are required to effect a spill cleanup. Only a limited amount of initial personnel to place the pads on the spill are necessary, and no other are required until retrieval is desired. That can be months if necessary. Present spill cleanup systems require constant supervision for the cleanup to be effective. The sorbent pads of the present invention may be dropped from the air, either by helicopter or plane, from as high as necessary or dispensed from a vessel, thereby limiting the labor force normally required to work a spill. Additionally, such procedures limit the exposure of necessary personnel to dangers, such as severe weather conditions.

When the sorbent pads are dropped from a cargo plane or helicopter onto an oil spill at sea, they stay with the spill picking up and holding the oil for later retrieval, even if the winds and waves move the spill. Therefore, when the above procedure is used, quick action occurs, thereby reducing the amount of oil which sinks to the bottom of the ocean. Sunken oil precludes recovery plus it forms tar balls which show up for years on beaches and coast lines Accordingly, the sorbent pads of the present invention may be used to soak up an oil spill in any waters, including arctic waters, during bad weather such that later retrieval can be effected whenever weather permits.

The sorbent pads of the present invention perform best when the water movement is most active. For example, in severe weather conditions where skimmers, booms, and other sorbents are not effective because of wave action and high winds, the present invention is at its peak effectiveness. It is also more effective than the other systems in calm waters such as inland waterways, ports, marinas, etc.

The effectiveness of the pads increase proportionally with the roughness of the seas. Pads should be dropped upon the spill immediately after the spill occurs allowing a retrieval unit to recover the pads at a later date if the weather is too severe. Spills may be cleaned-up and reclaimed virtually anywhere, regardless of the weather.

In addition, because the oil products are reclaimed, and the pads are reusable many times, the standard disposable methods which are environmentally harmful, such as burning or burying oil saturated sorbents, are almost completely eliminated.

In placing the pads upon the spill, they may be secured together using lanyards for complete coverage of the effected water surface or hooked end-to-end to encircle the spill. They may be either allowed to move with the current or anchored in place.

In summary, the present invention is a two-part sorbent pad which is chemically treated to recover oil. Once the pads are applied to an oil spill, they will float with the spill until recovery is possible. If recovery is immediately possible, the pads may be retrieved and rung out for reapplication to the spill. Therefore, because of the present invention's reusability, ability to hold oil for reclamation, and increased effectiveness in rough weather, it is an improvement over conventional oil recovery systems.

BRIEF DESCRIPTION OF THE DRAWINGS

FIG. 1 shows a perspective cross-sectional view of the two-part sorbent pad according to the preferred embodiment of the present invention.

DETAILED DESCRIPTION OF THE PREFERRED EMBODIMENT

Referring to FIG. 1, a sorbent pad according to the preferred embodiment of the present invention will be described. Sorbent pad 10 comprises exterior cover 11 which is made of chemically treated polypropylene fiber 12 attached in loop fashion to backing 13 which is formed of chemically treated semi-rigid porous polypropylene. Polypropylene fibers 12 and polypropylene backing 13 form a durable fabric which functions by adsorption and capillary action to transfer oil from fibers 12 through porous backing 13 to inner core 14. Inner core 14 is made of chemically treated polyurethane foam having an open cell structure which both adsorbs and absorbs the oil. The petroleum product is retained in inner core 14 by both surface tension and molecular cohesion. The chemical treatment (discussed herein) enhances the molecular cohesion of the polyurethane foam to cause it to have an affinity for oil and possess oleophilic characteristics.

In the preferred embodiment, inner core 14 is surrounded by backing 13 which is then surrounded by fibers 12. The outer edges of that arrangement is then seam-stitched together to form sorbent pad 10 of the present invention. One of ordinary skill in the art will readily recognize that any means, such as heat sealing, could be used to seal the edges of sorbent pad 10. Additionally, sorbent pad 10 may be of any shape or size.

Sorbent pad 10 of the present invention functions to retain liquid hydrocarbons within inner core 14 and prevent it from returning to the water by chemically treated polypropylene backing 13 being firmly pressed against the outer surface of inner core 14, thereby forming a one-way valve which allows oil to pass through to inner core 14 but not out, yet allows water to pass through both ways. As the oil-laden water passes through outer cover 11 to inner core 14, the oil is removed from the water. The oil-free water then passes completely through sorbent pad 10 to exit from the opposite side, or returns the way it entered, depending upon the wind and/or wave action, or movement of the water.

Additionally, the retained oil product is positioned within cells 15 of inner core 14 such that cells 15 surround the oil, which at this point is divided into cell-size droplets. The droplets adhere to cells 15 through both adsorption and molecular attraction which exhibit a tremendous amount of cohesion to the cell walls. Thus, the droplets are essentially surrounded by the cell walls and protected from the entry of water, which reduces or eliminates emulsification and water-borne contamination. Additionally, by not being exposed to the atmosphere, which causes heat or cold extremes, strong winds, and direct sunlight, the evaporation of the volatile components of the oil product or oil is either eliminated or substantially reduced.

The chemical compounds comprising the treatment coating and the application process for chemically treating sorbent pad 10 will now be described. Each component (inner core 14, backing 13, and fibers 12) of sorbent pad 10 is separately treated to make them attract oil and repel water with a mixture of the following compounds. Each compound is added according to its weight based on the overall weight of the compound.

Paraffin is used to increase the affinity of the coating for petroleum hydrocarbons and provide it with water repellency when dry. Paraffin is added in a range of 2% to 20% by weight.

Resin is provided in two forms. A short oil-modified urethane resin is used to help attach the coating to the surface of the sorbent pad. It acts as a wax dispersion agent, adds flexibility to the coating after drying, speeds drying time and helps provide water repellency when coated to the outer surface. The short oil-modified acrylic resin is added in a range of 1% to 10% by weight.

A long oil-modified acrylic urethane resin is also used to increase the flexibility and wearing properties of coating, and to increase the affinity of the coating for petroleum hydrocarbons. The long oil-modified acrylic urethane resin is added in a range of 1% to 10% by weight.

Mineral spirits is used as a solvent to serve as a carrier for the formulation of solids. It is added in a range of 60% to 80% by weight.

Naphtha is used as a solvent to speed the drying time of the entire compound and aid in low temperature application. Naphtha is added in a range of 10% to 30% by weight.

For application, the above compounds are added together by the appropriate percent weight and then vigorously mixed together. Each component of the sorbent pad is then either sprayed or dipped in the resulting coating to provide the chemical treatment. After the components of the sorbent pad are dipped or sprayed, they are run through a wringer or rollers to remove the excess coating. Each part of the sorbent pad is allowed to dry, and then sewn or stitched together to form the sorbent pad of the present invention.

From the foregoing description and illustration of this invention, it is apparent that various modifications can be made by reconfigurations or combinations to produce similar results. It is, therefore, the desire of the applicant not to be bound by the description of this invention as contained in this specification, but to be bound only by the claims as appended hereto.

I claim:

1. A sorbent pad for removing crude oil or petroleum hydrocarbons from a water surface, comprising:
   an inner storage core for attracting said oil and petroleum hydrocarbons and repelling water; and
   an outer protective cover surrounding said inner storage core for attracting said oil and petroleum hydrocarbons and repelling water, said outer protective cover comprising fibers attached to a semi-rigid porous backing;
   said pad having a coating including the chemical composition comprising paraffin, resin, mineral spirits and naphtha.

2. The sorbent pad according to claim 1, wherein said inner storage core comprises open cell polyurethane foam.

3. The sorbent pad according to claim 2, wherein said fibers of said outer protective cover are comprised of polypropylene and said semi-rigid porous backing of said outer protective cover is comprised of polypropylene.

4. The sorbent pad according to claim 3, wherein said outer protective cover wicks oil to said inner storage core by capillary action.

5. The sorbent pad according to claim 4, wherein said outer protective cover prevents said stored oil and petroleum hydrocarbons from re-entering the water.

6. The sorbent pad according to claim 5, wherein said outer protective cover protects said stored oil and petroleum hydrocarbons from evaporation, emulsification, and contamination.

7. The sorbent pad according to claim 1, wherein said sorbent pad is reusable.

8. A sorbent pad according to claim 1, wherein said paraffin is provided in the range of 2% to 20% by weight of said chemical composition.

9. A sorbent pad according to claim 1 wherein said resin comprises a short oil-modified urethane resin provided in the range of 1% to 10% by weight of said chemical composition.

10. A sorbent pad according to claim 1, wherein said resin comprises a long oil-modified acrylic urethane resin provided in the range of 1% to 10% by weight of said chemical composition.

11. A sorbent pad according to claim 1, wherein said mineral spirits is provided in the range of 60% to 80% by weight of said chemical composition.

12. A sorbent pad according to claim 1, wherein said naphtha is provided in the range of 10% to 30% by weight of said chemical composition.

* * * * *